Sept. 25, 1951 S. S. McNEARY ET AL 2,568,923
EXPANSION JOINT APPARATUS
Filed March 23, 1948 2 Sheets-Sheet 1

WITNESSES:
V. W. Novak
D. J. McCarty

INVENTORS
SAMUEL S. McNEARY
WILLIAM R. BERRY
BY
ATTORNEY

Patented Sept. 25, 1951

2,568,923

UNITED STATES PATENT OFFICE 2,568,923

EXPANSION JOINT APPARATUS

Samuel S. McNeary, Ardmore, Pa., and William R. Berry, Camden, N. J., assignors to Westinghouse Electric Corporation, East Pittsburgh, Pa., a corporation of Pennsylvania Application March 23, 1948, Serial No. 16,404

1 Claim. (Cl. 285—90)

The invention relates to an expansion joint for connecting adjacent ends of pipes or vessels subjected to pressure, and it has for an object to provide apparatus of this character providing for relative axial displacement of the adjacent pipe ends as well as relative lateral movement and angular displacement of the pipes while at the same time operating to balance or neutralize pressure forces acting on the pipe ends, which forces are unbalanced and must be carried by anchorages provided in the piping system because of the absence of stress-bearing connecting structure occasioned by the introduction of a joint providing for the aforesaid relative axial, lateral and angular movements.

A further object of the invention is to provide apparatus of the character aforesaid operable so as to allow for thermal expansion of the connecting piping between anchored pressure vessels and/or relative movement of the vessels, while imposing zero resultant pressure load, or a load of a desired value in either direction, on the latter.

The foregoing and other objects are effected by the invention as will be apparent from the following description and claim taken in connection with the accompanying drawings, forming a part of this application, in which:

Figure 1:
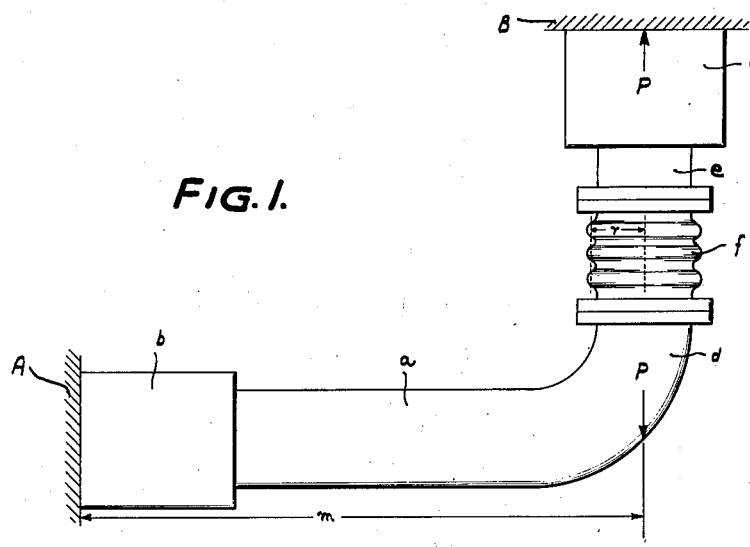
Fig. 1 is a diagrammatic view illustrative of principles of the invention.

In Fig. 1, the pipe $a$ joins anchored vessels $b$ and $c$ arranged at right angles and the pipe includes pipe sections $d$ and $e$ joined by the flexible expansion joint $f$. If the internal pressure of the pipe and vessels differs from the external pressure, there results an unbalanced pressure load on the vessels and consequently a reaction at their anchorages. If $p$ is the difference between the internal and external pressures and, as shown in Fig. 1, $r$ is the radius of the effective area of the joint, the vessel $c$ experiences a vertical force P equal to $\pi r^2 p$ and the vessel $b$ experiences the same vertical force and a moment equal to P times $m$. In the illustration the forces P are shown acting in the sense corresponding to the case where the internal pressure is greater than the external pressure, and they would have opposite directions for the case where the external pressure is greater than the internal pressure. When the vessels are such that this unbalanced loading is detrimental to the operation of the equipment, it is desirable to have a device which will counterbalance this loading, thereby eliminating the tendency to displace the vessels and to impose load upon their anchorages. Such is the case when a vessel is a turbine and expansion joints are used in the inlet, exhaust or extraction piping. Apparatus capable of achieving this purpose will now be described.

Figure 2:
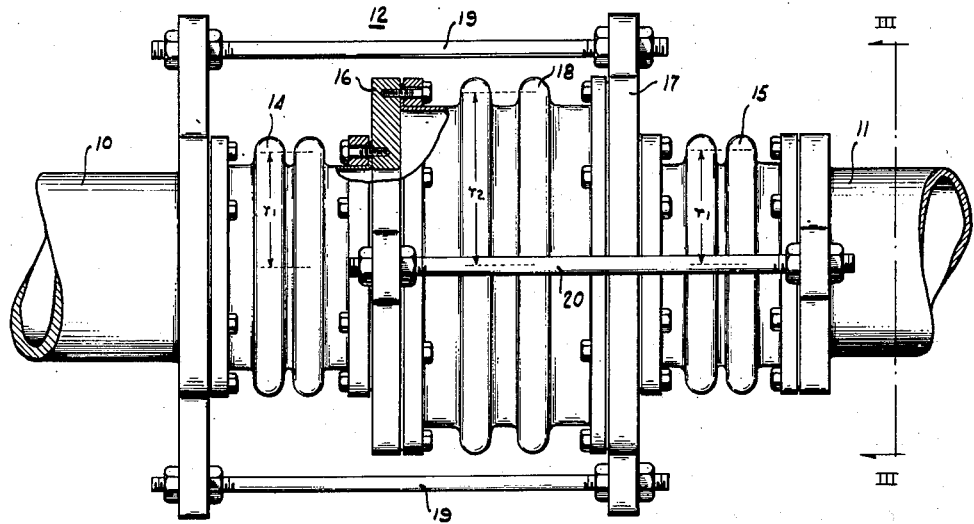
Fig. 2 is a side elevational view of one form of the invention.
Figure 3:
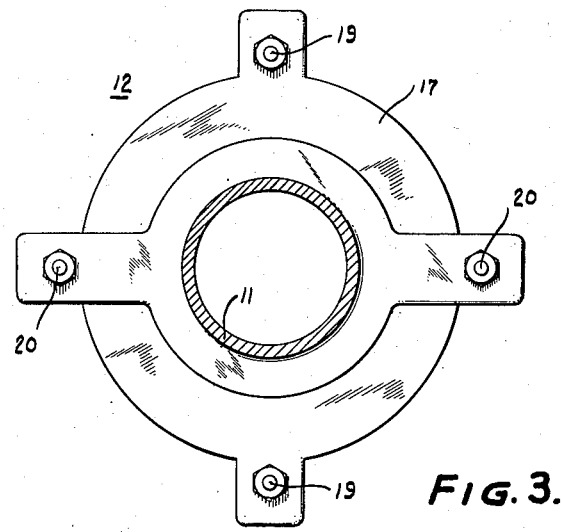
Fig. 3 is an end elevation of apparatus shown in Fig. 2 and viewed in the direction of the arrows applied to the section line III—III.

In Figs. 2 and 3, the pipe members 10 and 11 are connected by the expansion joint unit, at 12.

The expansion joint unit includes outer expansion joints 14 and 15 connecting the pipe members 10 and 11 to intermediate annular members 16 and 17, which are connected by the intermediate or middle expansion joint 18. The pipe member 10 is connected to the intermediate member 17 by a pair of diametrically-opposed tie rods 19. Likewise, the pipe member 11 is connected to intermediate member 16 by a pair of diametrically-opposed tie rods 20, the plane of the tie rods 20 being at right angles to that of the tie rods 19.

In Figs. 2 and 3, the expansion joints 14, 15 and 18 are provided by bellows or accordion elements.

With the pipe sections 10 and 11 connected, respectively, to remote ends of the intermediate bellows element 18 by the tie rods 19 and 20, it will be apparent that, to the extent that the effective pressure area of the intermediate bellows element is larger than that of either outer bellows element, to that extent is the unbalanced expansion joint pressure force acting on the pipe members 10 and 11, and the vessels to which they are connected, opposed or balanced. If the effective area of the intermediate bellows element is twice that of one of the outer bellows elements, that is, if $r_2$ equals $\sqrt{2}\, r_1$, then the difference in pressure $p$ acting on intermediate element 17 and transmitted through tie rods 19 produces a longitudinal stress in pipe member 10 such as is required to eliminate the reactions which would otherwise be set up in the anchorage of the vessel to which pipe member 10 is connected. In the same manner, the force due to pressure difference $p$ acting on intermediate element 16 and transmitted through tie rods 20 produces a longitudinal stress in pipe member 11, such as is required to eliminate the reactions which would otherwise be set up in the anchorage of the vessel to which pipe member 11 is connected.

If the expansion joint unit is compressed, then the outer joints close and the central one opens, each by the same amount equal to the compression of the total unit. On the other hand, if the unit is extended, then the outer joints open and the central one closes each by the same amount equal to the extension of the total unit. Therefore, the expansion joint unit is capable of accommodating relative axial movement of the pipe members. Furthermore, as the accordion or bellows elements provide flexibility for lateral and angular displacements, and as the tie rods may be flexed laterally and angularly, it will be apparent that the pipe members 10 and 11 may undergo lateral and angular displacements relative to one another.

Figure 4:
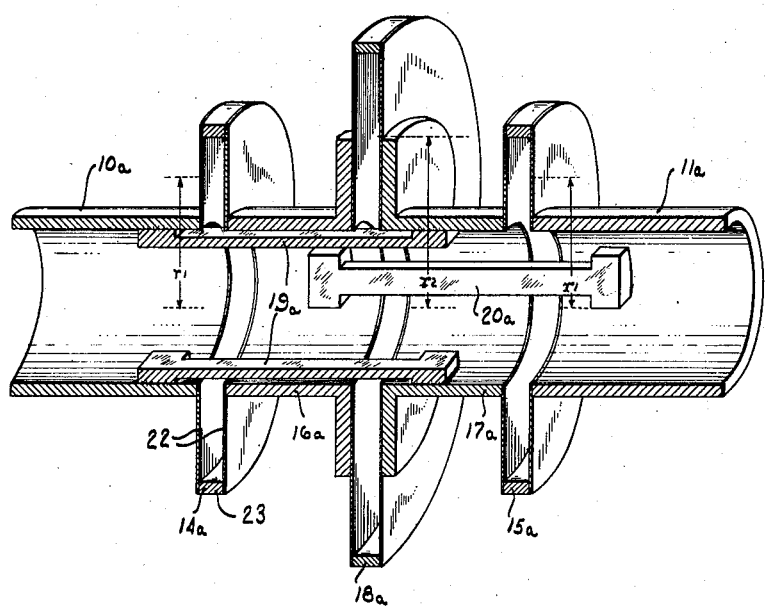
Fig. 4 is a sectioned oblique projection view of a modified form of the invention.

In Fig. 4, there is shown an expansion joint unit involving the same operating principles as already described, incorporating internal tie links and a different type of flexible element. Accordingly, the pipes 10a and 11a are connected by expansion joints 14a and 15a to intermediate pipe sections 16a and 17a joined by the intermediate expansion joint 18a.

Each of the expansion joints 14a, 15a and 18a is comprised by opposed radially-extending, spaced annular diaphragm plates joined at their outer peripheries. For example, the expansion joint 14a includes a pair of radially-extending diaphragm plates 22 joined by a peripheral ring 23 and each of the other expansion joints is of similar construction except that the intermediate expansion joint has radial diaphragm plates of larger radius to provide an effective pressure area of the intermediate joint which is twice that of either outer expansion joint.

As the pipe 10a is connected to the intermediate pipe section 17a by internal tie links 19a and as the pipe 11a is connected by internal tie links 20a to the intermediate pipe section 16a, it will be apparent that, as before, with the same relationship of effective areas of expansion joints, the intermediate expansion joint will produce longitudinal stress in the pipes 10a and 11a, in consequence of which the expansion joint unit operates to accommodate relative axial displacements of the coupled pipes without this capability introducing pressure reactions at the anchorages. This construction is also capable of accommodating relative lateral and angular displacement of the coupled pipes by virtue of the flexibility of the diaphragm plates and of the tie links.

While we prefer to have an intermediate expansion joint whose effective pressure area is twice that of either outer expansion joint, it will be apparent that the invention is applicable in situations where the ratio is different, providing anchorage conditions are suitable. Also, while the outer expansion joints are shown each with the same effective pressure area, one might be larger than the other. In general, the invention involves balancing or practical neutralization of pressure forces imposed upon the pipe sections and the attached vessels.

While the invention has been shown in several forms, it will be obvious to those skilled in the art that it is not so limited, but is susceptible of various other changes and modifications without departing from the spirit thereof.

What is claimed is:

In an expansion joint, first and second pipe members, first and second intermediate annular members, outer expansion joints connecting the first and second pipe members to the first and second intermediate members, respectively, a middle expansion joint connecting the intermediate members, a first pair of diametrically-opposed tie rods connecting the first pipe member and the second intermediate member, and a second pair of diametrically-opposed tie rods connecting the second pipe member and the first intermediate member, the plane of the first pair of rods being arranged at right angles to that of the second and the effective pressure area of the middle expansion joint being larger than that of either outer joint.

SAMUEL S. McNEARY.
WILLIAM R. BERRY.

REFERENCES CITED

The following references are of record in the file of this patent:

UNITED STATES PATENTS

| Number | Name | Date |
| --- | --- | --- |
| 2,314,776 | Dittus et al. | Mar. 23, 1943 |
| 2,348,833 | Miller | May 16, 1944 |